H. SMITH.
MEANS FOR PRODUCING AND CONTROLLING PNEUMATIC PRESSURE.
APPLICATION FILED JUNE 26, 1912.
1,064,557.
Patented June 10, 1913.
2 SHEETS—SHEET 1.
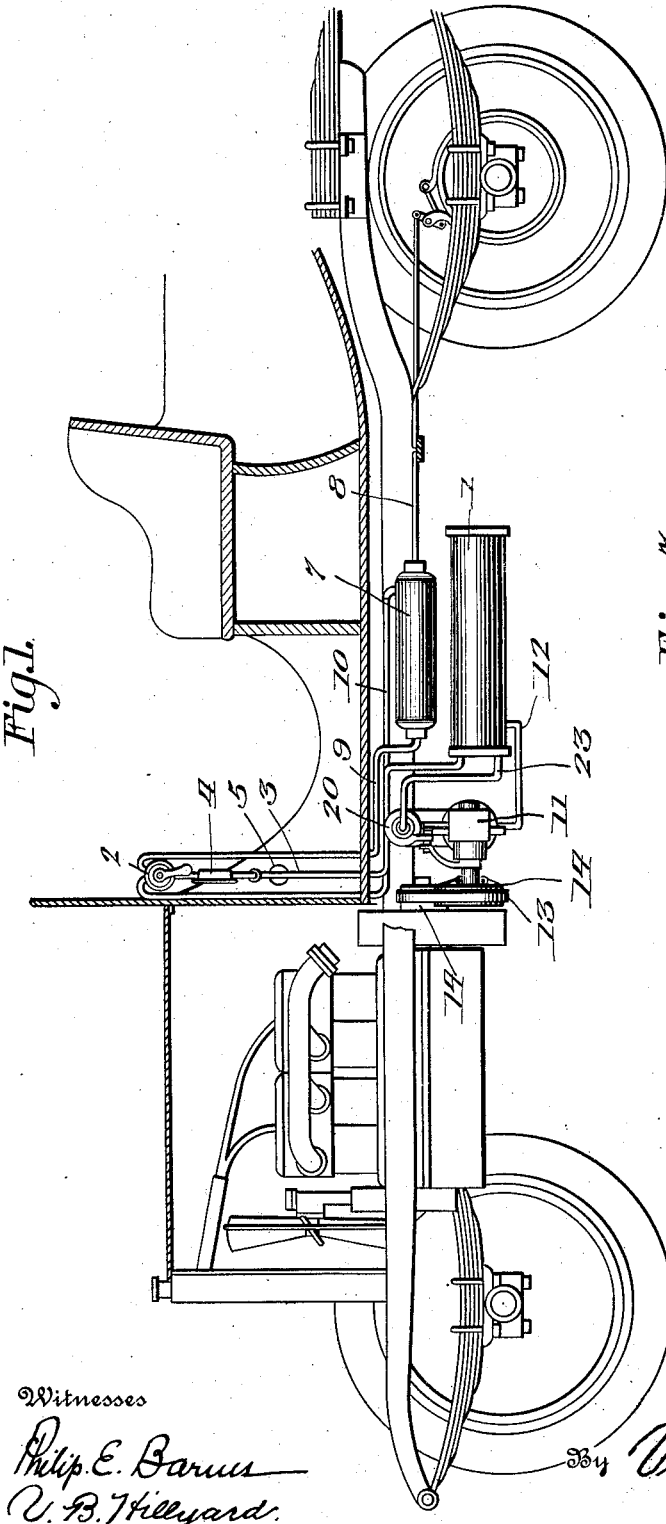
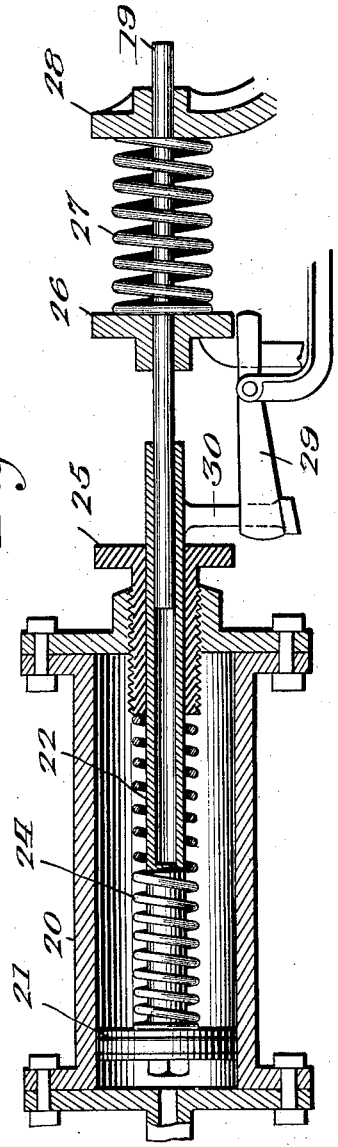
Inventor
Harry Smith
Witnesses
Philip E. Barnes
V. B. Hillyard.
By Victor J. Evans
Attorney

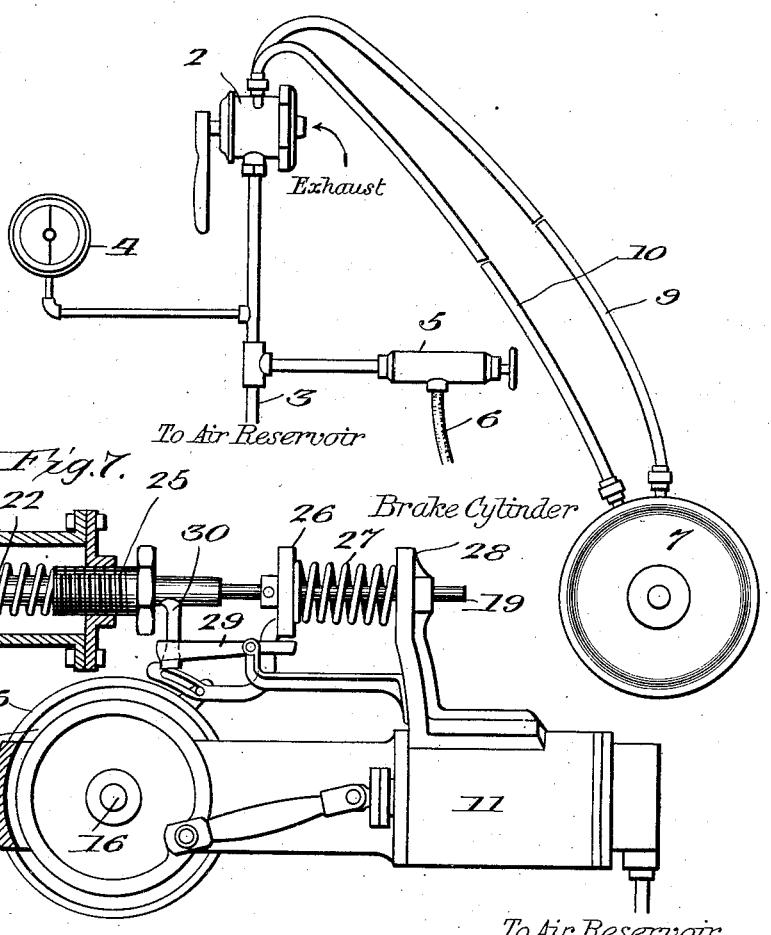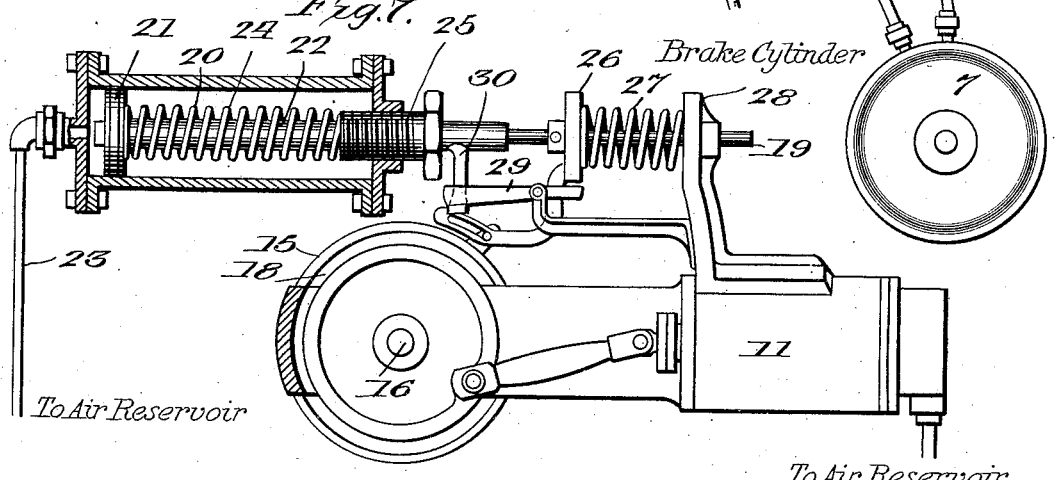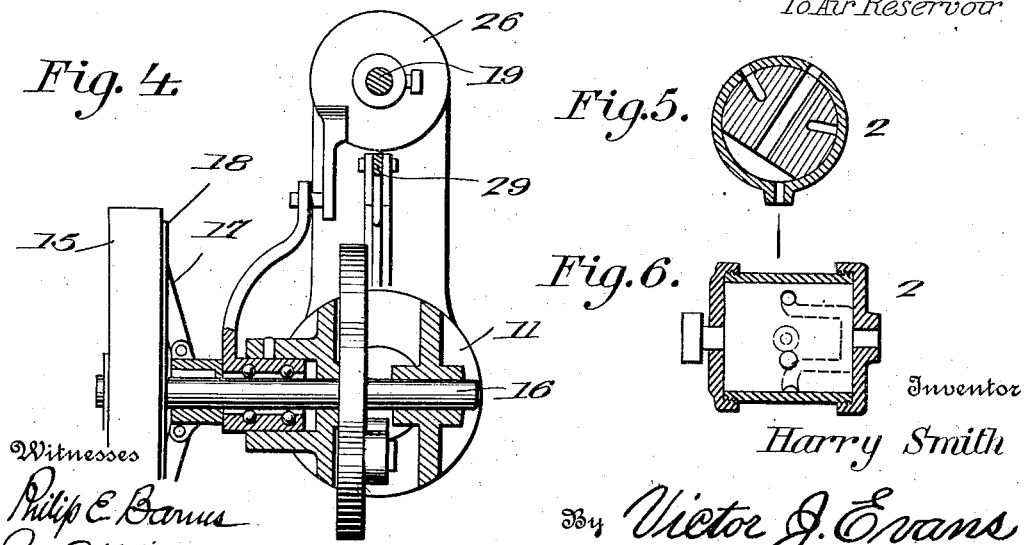

UNITED STATES PATENT OFFICE.

HARRY SMITH, OF HARPERS FERRY, IOWA.

MEANS FOR PRODUCING AND CONTROLLING PNEUMATIC PRESSURE.

1,064,557.
Specification of Letters Patent.
Patented June 10, 1913.

Application filed June 26, 1912. Serial No. 706,003.

*To all whom it may concern:*

Be it known that I, HARRY SMITH, a citizen of the United States, residing at Harpers Ferry, in the county of Allamakee and State of Iowa, have invented new and useful Improvements in Means for Producing and Controlling Pneumatic Pressure, of which the following is a specification.

The operation of automobiles on long trips is attended with fatigue to the driver by reason of the frequent manipulation of the brakes to properly control the speed of the machine when descending grades. Should it be required to inflate a tire additional labor is involved in operating the pump or tire inflating device.

The present invention provides a simple effective and unique mechanism which admits of the automatic control of the brake mechanism and the inflation of the tire when necessary.

The invention provides a mechanism which may be adapted to any make of machine, the same embodying a reservoir for containing air under pressure, a brake cylinder arranged for operating the brakes, a valve under control of the operator for admitting air from the reservoir to the brake cylinder both for setting and releasing the brakes, means for coupling the air reservoir to the tire to be inflated, an air compressor adapted to be driven by means of the motor for replacing the air drawn from the reservoir for operating the required part, and a regulator for automatically throwing the air compressor into or out of action, said regulator being controlled by the change or variation of pressure within the air reservoir, so that when the reservoir is charged with air to the predetermined number of pounds per square inch the air compressor will be thrown out of action and when the air pressure within the reservoir is lowered to a given point the air compressor is thrown into action so as to supply the reservoir and maintain the required pressure of air therein.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a side view of an automobile, partly in section, showing the application of the invention. Fig. 2 is a detail view of the brake cylinder, controlling valve, gage and valved outlet with intermediate pipe connections. Fig. 3 is a sectional view of the regulator and lock mechanism for holding the clutch and the compressor operating mechanism out of action, said parts being illustrated on a larger scale. Fig. 4 is a transverse section of the clutch operating rod and intermediate connections and bearings therefor. Fig. 5 is a transverse section of the controlling valve. Fig. 6 is a horizontal section of the controlling valve. Fig. 7 is a detail view of the compressor, regulator, the lock mechanism for holding the clutch out of action and the means for tripping the lock and throwing the clutch into action.

Corresponding and like parts are referred to in the following description, and indicated in all the views of the drawings, by the same reference characters.

It is to be understood that the arrangement of parts will vary in the adaptation of the invention and will depend largely upon the make and style of machine having the devices installed thereon. The position of the parts is one largely of convenience as well as equalization of the weight so as to distribute the same as nearly uniform as possible.

The numeral 1 designates a reservoir for containing air under pressure. This reservoir may be of any capacity and construction. A controlling air valve 2 is conveniently located preferably upon the dash of the machine and is connected with the reservoir by means of a pipe 3. A pressure indicating gage 4 is located in the length of the pipe 3 in such a position as to be under observation at all times. An outlet 5 is arranged in the length of the pipe 3 and is provided with a valve, said outlet providing means for the convenient coupling to the pipe 3 of a rubber tube 6 which is adapted to be connected in the well known manner to any one of the tires of the machine to be inflated.

A brake cylinder 7 is arranged in any convenient position and its piston is connected by means of a rod 8 with the brake mechanism so as to set or to release the brakes as may be required. The brake mechanism and the manner of connecting the rod 8 thereto may be of any well known construction and form no essential part of the present invention. Pipes 9 and 10 connect opposite ends of the brake cylinder with the air controlling valve 2 so that the air may be admitted to either end of the brake cylinder to set or to release the brakes as may be required, the air being exhausted from the end of the brake cylinder opposite that receiving the air pressure. The air controlling valve 2 may be of any well known construction which will admit of air passing therethrough to one end of the brake cylinder and of the air exhausting from the opposite end of the brake cylinder through the air valve into the atmosphere.

The air compressor is indicated at 11 and may be of any type and is connected with the reservoir 1 by means of a pipe 12. The air compressor is adapted to be driven by means of the motor utilized for propelling the machine. While the connecting means between the motor and air compressor may be of any construction for convenience a drive belt 13 is shown connecting a pulley 14 secured to the shaft of the engine with a pulley 15 loose upon the shaft 16 of the air compressor. A clutch is had between the shaft 16 and pulley 15 for connecting the two when it is required to operate the air compressor when the engine or motor is running. The clutch may be of any variety, one of the friction type being preferred since it enables the compressor to be started and stopped by a gradual movement, thereby avoiding any jar or shock by the use of a clutch of a positive nature. The clutch consists of two members 17 and 18, the latter forming a part of the loose pulley 15 and the clutch member 17 being splined to the shaft 16 and movable by means of a rod 19 which transmits movement from an automatic regulator to the clutch for throwing the latter into or out of operation.

The regulator consists of a cylinder 20 and a piston 21 arranged to operate therein, said piston having a hollow stem 22 which extends through one end of the cylinder, the opposite end of the cylinder being connected with the air reservoir 1 by means of a pipe 23. A spring 24 normally exerts a pressure upon the piston 21 to force the same toward the end of the cylinder to which the pipe 23 is connected. The spring 24 is expansible and of helical form and is mounted upon the hollow stem 22 and is confined between the piston 21 and a set nut 25 threaded into the end of the cylinder through which the stem 22 passes, thereby admitting of varying the tension of the spring 24 so that the air compressor may be thrown into or out of operation at any required air pressure. The rod 19 telescopes with the hollow stem 22 and is provided with a stop 26 in the form of a set collar. An expansible helical spring 27 is mounted upon the rod 19 and is confined between the stop 26 and a stop 28, the latter consisting of a part of the air compressor. The spring 27 holds the clutch in engagement when the air compressor is in operation. When the spring 27 is compressed by the outward movement of the stem 22 the clutch is thrown out of action and the air compressor remains at rest. This occurs when the air pressure within the reservoir 1 is above a given number of pounds per square inch. A lock 29 engages the stop 26 and holds the spring 27 compressed and the clutch out of engagement when the pressure within the reservoir 1 is above a given point. When the pressure within the reservoir 1 falls below a given point a trip 30 carried by the stem 22 engages the lock 29 and releases the stop 26 when the spring 27 comes into play and throws the clutch into engagement and the air compressor into operation to charge the air reservoir. As the pressure of the air within the reservoir 1 increases the piston 21 is gradually moved in the cylinder 20 to project the stem 22 and to compress the spring 24 and as the pressure gradually reaches the predetermined point the stem 22 comes in contact with the stop 26 and moves the latter so as to compress the spring 27 and to throw the clutch out of action. The clutch remains in operation until the stop 26 clears the lock 29 when it is thrown out of engagement and held inactive by the lock 29 engaging the stop 26. As the pressure of the cylinder 20 is reduced the piston 21 moves inward and at a predetermined time the lock 29 is tripped and releases the stop 26 so that the clutch may be again thrown into action to operate the compressor for recharging the reservoir.

It will be understood that the compressor is not thrown into operation until the pressure within the air compressor has fallen to a given point, hence provision is had for a variation of between fifty to one hundred pounds more or less of pressure within the reservoir without affecting the compressor either to throw the same into or out of operation.

The stop 26 preferably consists of a disk which is made fast in any manner to the rod 19 so as to move therewith. The lock 29 consists of a bar which is pivoted between its ends to a suitable support, said bar having an approximate horizontal arrangement. The end of the bar remote from the stop 26 is weighted and inclined upon its lower side and engages the trip 30 which consists of an arm pendent from the stem 22. When the piston 21 moves outward in the cylinder 20 the arm 30 rides upon the inclined side of the bar 29, thereby permitting the weighted end of such bar to gravitate, whereby the opposite end of the bar is brought in contact with the stop 26. When the stop 26 is moved by the action of the piston 20 so as to clear the end of the bar or lock 29 the latter moves to bring the end adjacent the stop in the path thereof, thereby holding such stop repressed against the action of the spring 27. When the piston 21 returns to a normal position in the cylinder 20 the arm 30 moves so as to trip the lock 29 and disengage the end in contact with the stop 26 from such stop, which latter is caused to assume a normal position by the action of the spring 27.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. The herein described mechanism for the purpose specified the same consisting of a cylinder, a piston arranged to operate therein; means for moving the piston in one direction, a spring for moving the piston in an opposite direction, a stop, a spring acting on the stop to hold it in a given position, a lock for holding the stop when moved by the said piston, and a trip connected with the piston for disengaging the lock from the stop.

2. The herein described mechanism for the purpose specified, the same consisting of a cylinder, a piston arranged to operate therein, means for moving the piston in one direction, a spring for moving the piston in an opposite direction, a stop arranged to be operated by means of the piston, a spring acting on the stop to hold it in a given position, a lock consisting of a bar pivoted between its ends and having one of such ends arranged to engage the stop, the opposite end portion being inclined, and a trip having connection with the piston and arranged to coöperate with the inclined part of the lock to effect positive movement of the latter.

3. The herein described mechanism for the purpose specified, the same consisting of a cylinder, a piston arranged to operate therecylinder, a piston arranged to operate therein and provided with a tubular stem, a rod telescoping with such tubular stem, means for moving the piston in one direction, a spring mounted upon the tubular stem and adapted to move the piston in an opposite direction, a stop secured to the said rod, a spring normally holding the stop in a given position, a lock arranged to engage the stop and hold it when moved against the tension of its operating spring, and a trip carried by the said tubular stem and adapted to effect a release of the lock from the said stop.

4. In mechanism of the character and for the purpose herein set forth, the combination of a cylinder, a piston arranged within the cylinder, a tubular stem connected with the piston and extending through an end of the cylinder, a set nut threaded to the end of the cylinder through which the tubular stem passes and having the latter extending therethrough, an expansible helical spring mounted upon the tubular stem between the piston and set nut, a rod telescoping with the tubular stem, a stop secured to said rod, a spring normally exerting a pressure upon the stop to hold it in given position, a pivoted lock arranged to engage the stop to hold it when moved against the tension of its operating spring, and a trip carried by the tubular stem and adapted to release the lock from the said stop.

In testimony whereof I affix my signature in presence of two witnesses.

HARRY SMITH.

Witnesses:
THOMAS A. HOULIHAN,
EDWARD J. AVERY.